March 18, 1958    H. H. BERRIER, JR    2,827,042
SMALL ANIMAL SPECULUM
Filed June 4, 1956
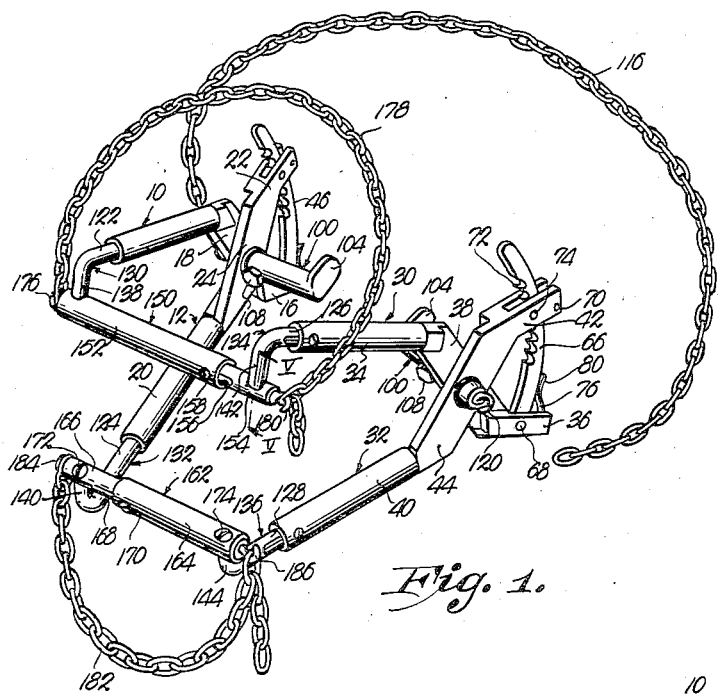
*Fig. 1.*
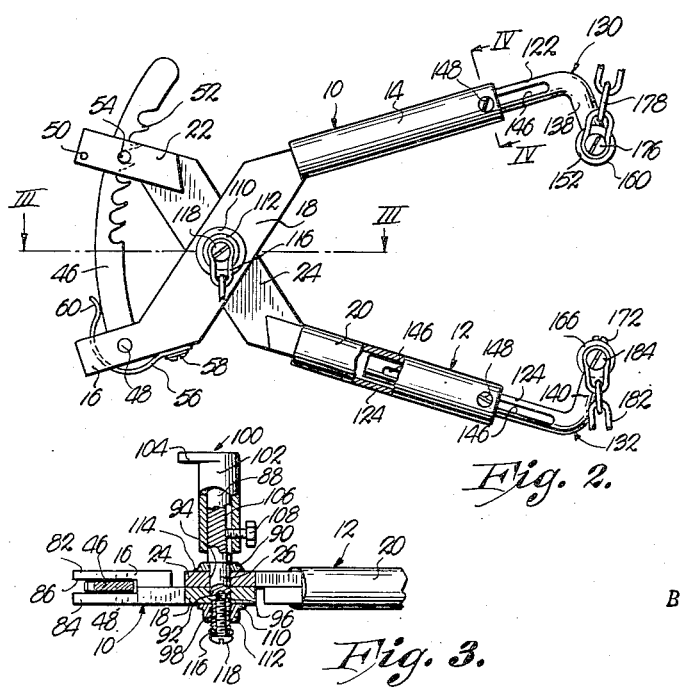
*Fig. 2.*
*Fig. 3.*
*Fig. 4.*
*Fig. 5.*
INVENTOR.
Harry H. Berrier, Jr.
BY
ATTORNEY.

2,827,042
SMALL ANIMAL SPECULUM
Harry H. Berrier, Jr., Columbia, Mo.
Application June 4, 1956, Serial No. 589,074
7 Claims. (Cl. 128—19)

This invention relates generally to the field of apparatus for use by veterinarians in examining and treating small animals. More particularly, the invention is concerned with the provision of an improved speculum for use in holding open the mouths of small animals during examination or treatment requiring access to the oral cavity of the animal.

Speculums previously available for the same general purpose have been subject to several definite disadvantages, among which may be mentioned the lack of adaptability of a given speculum for use with different animals having heads and mouths of various sizes and shapes and the fact that prior devices, by virtue of their inherent nature and construction, tended to obstruct access to the oral cavity of the animal, particularly from the sides thereof.

Accordingly, it is the primary object of this invention to provide a speculum overcoming all of the above-mentioned and other disadvantages inherent in prior devices of the same general class.

It is another important object of the invention to provide an improved speculum which is adjustable in length, width and spread of opening, so that the same speculum may be used with, for example, dogs of all sizes and breeds, with the instrument being fitted to the particular dog being treated in a manner assuring that the instrument will remain fixed in the desired position regardless of efforts on the part of the animal to dislocate the same.

It is another important object of the invention to provide such a speculum of nature giving the veterinarian full and unobstructed, continuous access to any part of the animal's oral cavity from the front and either side of the animal's mouth, which feature is particularly important when work is being done on the animal's rearwardly disposed teeth.

Another important object of the invention is to provide such a speculum which is adapted for complete disassembly during cleaning and sterilization.

Still other important objects of the invention, including certain significant details of construction, will be made clear or become apparent as the following description of the invention progresses.

In the accompanying drawing:

Fig. 1 is a perspective view of one embodiment of the improved speculum contemplated by the invention;

Fig. 2 is a fragmentary, side elevational view of the speculum, with parts being broken away and shown in section for clarity of illustration;

Fig. 3 is a fragmentary cross sectional view taken on line III—III of Fig. 2;

Fig. 4 is a cross sectional view taken on line IV—IV of Fig. 2; and

Fig. 5 is a fragmentary cross sectional view taken on line V—V of Fig. 1.

Referring now to the accompanying drawing, the speculum includes a first pair of crossed, elongated members generally designated 10 and 12 hereinafter sometimes respectively referred to as the upper right member 10 and the lower right member 12.

Member 10 includes a straight, elongated, forwardmost, tubular portion 14, an elongated, befurcated, rearmost portion 16, and a flattened, elongated, intermediate portion 18.

Member 12 is of generally the same configuration as member 10 except for being reversed in position and includes a straight, elongated, forwardmost, tubular portion 20, an elongated, bifurcated, rearmost portion 22, and a flattened, elongated, intermediate portion 24. The flattened portions 18 and 24 of upper right member 10 and lower right member 12 respectively are crossed in scissor-like fashion and pivotally interconnected by a pin 26 (Fig. 3) hereinafter more fully described.

Laterally spaced from the right members 10 and 12 are a second pair of correspondingly formed members 30 and 32 respectively hereinafter sometimes referred to as the upper left member 30 and the lower left member 32.

The upper left member 30 includes a straight, elongated, forwardmost, tubular portion 34, an elongated bifurcated, rearmost portion 36, and a flattened, elongated, intermediate portion 38, while the lower left member 32 includes a straight, elongated, forwardmost, tubular portion 40, an elongated, bifurcated, rearmost portion 42, and a flattened, elongated, intermediate portion 44. The crossed portions 38 and 44 of the left members 30 and 32 are pivotally interconnected in scissor-like fashion by a pin in all respects similar to the pin 26 previously identified and hereinafter further discussed.

Each of the members 10, 12, 30 and 32 is preferably formed of metal and may be either integrally formed by machining or constituted of separately machined portions interconnected in any suitable manner, as by welding. The integral construction, as illustrated, is currently preferred.

An elongated, arcuately curved, ratchet element 46 is swingably interconnected to the bifurcated portion 16 of upper right member 10 by a pivot pin 48 engaging the element 46 between the bifurcated legs of portions 16. Ratchet element 46 extends upwardly from bifurcated portion 16 and pin 48 between the bifurcated legs of portion 22 of lower right member 12 and is retained between the legs of bifurcated portion 22 by a pin 50 extending across the portion 22 adjacent the rear thereof. The element 46 is provided on its forwardmost edge with a series of ratchet teeth 52 adapted to engage a transverse holding pin 54 extending across the portion 22 and between the legs thereof in forwardly spaced relation to the pin 50. Pins 50 and 54 are sufficiently spaced to permit disengagement of the teeth 52 from the pin 54 when the element 46 is swung about the pivot of pin 48 in a direction moving the rearmost edge of element 46 into contact or adjacency with the pin 50. A leaf spring 56 is mounted on the portion 16 of upper right member 10 adjacent the forwardmost extremity of portion 16 by means of a screw or the like 58, the opposite extremity of spring 58 bearing upon the rearmost edge of ratchet element 46 as at 60 to yieldably bias the element 46 in a forward direction assuring normal engagement of the teeth 52 with the holding pin 54.

It will thus be clear that by means of the ratchet element 46, the holding pin 54 and the spring 56, the members 10 and 12 may be adjustably locked against any movement of the forwardmost portions 14 and 20 of members 10 and 12 toward each other, and that the locking means may be readily released by a veterinarian to adjust the spacing or angle of spread between the portions 14 and 20 of members 10 and 12.

The left members 30 and 32 are provided with exactly similar structure, the various parts being identified by numerals as follows: the ratchet element as 66, the pivot pin for element 66 as 68, the confining pin on portion 42 as 70, the ratchet teeth as 72, the holding pin as 74, the biasing spring as 76, and the point of biasing contact as 80. Obviously, the members 30 and 32 are accordingly rendered subject to angular adjustment and locking in any position of spread in the same manner as described for members 10 and 12.

The configuration of the various bifurcated portions 16, 22, 36 and 42 is indicated by the more detailed showing of portion 16 in Fig. 3, wherein the legs of the bifurcated portion 16 are identified by the numerals 82 and 84 and the space therebetween within which the element 46 is received is identified by the numeral 86.

With reference particularly to Figs. 2 and 3, it will be seen that the pivot pin 26 for the right members 10 and 12 is elongated and includes a stud portion 88 extending inwardly or to the left from the crossed portions 24 and 18 of members 12 and 10 respectively, an outturned flange 90 abutting against the side of portion 24 of member 12, a bearing portion 92 extending through aligned perforations 94 and 96 of member portions 24 and 18 respectively, and an externally threaded portion 98 extending outwardly or to the right beyond the portion 18 of member 10. Telescoped upon the stud portion 88 of pin 26 is a retainer piece generally designated 100 having an elongated hollow part 102 adapted to slidably fit upon the stud portion 88 of pin 26 and a rearwardly extending ear 104. The stud portion 88 of pin 26 is provided with an elongated groove 106 on the forwardmost extremity thereof, and a set screw 108 threaded in the telescoped part 102 of piece 100 extends into groove 106 and is adapted for tightening to lock the piece 100 in any predetermined position of relative telescoping with stud portion 88 of pin 26. It will be understood by those skilled in the art that the piece 100 is adapted to extend within the rear corner of the animal's mouth for holding the lip of the animal. The desirability of the adjustability of the piece 100 upon the pin 26 arises from the varying thicknesses of the cheek or lips of different animals.

Threaded upon the portion 98 of pin 26 for holding the same in place is nut means preferably including a primary nut 110 and a lock nut 112. In order that the ear 104 of piece 100 will always be rearwardly directed, it is desirable to provide means for preventing rotation of the pin 26 relative to one of the members 12, which may be accomplished by spot welding as at 114 of the flange 90 to the crossed portion 24 of member 12.

One end of an elongated, flexible chain 116, which serves as a neck encircling strap upon the speculum, is releasably secured to the outermost end of pin 26 by means of a screw 118 threaded into the portion 98 of pin 26.

The pin 26 pivotally interconnecting the members 30 and 32 is configured and arranged in exactly the same manner as described for the pin interconnecting members 10 and 12, and is provided with a similar telescoped piece 100, the only difference being that the pin 26 for members 30 and 32 is provided with an outwardly extending hook element 120 instead of the screw 18. Such hook element 120 could be threaded into the portion 98 of the pin 26 for members 30 and 32, but is preferably press-fitted therein or otherwise rigidly connected with such pin 26 in order that the open side of the hook 120 will always be forwardly disposed for releasably receiving and holding any link of the chain 116. It will be observed, therefore, that the use of a chain 116 for the flexible neck encircling element of the apparatus is ideally adapted for a virtually infinite degree of adjustment within the desired range.

Respectively telescoped into the tubular portions 14, 20, 34 and 40 of members 10, 12, 30 and 32 respectively are the longer legs 122, 124, 126 and 128 of plunger elements generally designated 130, 132, 134 and 136 respectively having shorter legs 138, 140, 142 and 144. Each of the longer legs 122, 124, 126 and 128 is provided with an elongated groove 146 into which extends a set screw 148 threadably mounted in the tubular portion 14, 20, 34 or 40 of the corresponding member 10, 12, 30 or 32. As will be clear in Fig. 2, the groove 146 terminates at the end thereof remote from the leg 140 in spaced relation to the corresponding end of leg 124 so as to prevent inadvertent complete removal of the leg 124 from the tubular member portion 20 without complete loosening or removal of the corresponding set screw 148. Within the range of variable telescoping action provided by the groove 146, however, it will be clear that the plungers 130, 132, 134 and 136 are fully adjustable relative to the members 10, 12, 30 and 32 respectively and constitute, in essence, adjustably extensible continuations of the latter adapted to be rigidly but releasably fixed in any desired position of extention. It will be apparent that the engagement of the set screws 148 within the grooves 146 prevents undesired rotation of the plungers 130, 132, 134 and 136 about the longitudinal axes of their respective longer legs 122, 124, 126 and 128.

An upper, adjustably extensible bit or crossbar generally designated 150 includes a straight, partially tubular element 152 into which is telescoped a straight, elongated plunger element 154 provided with a longitudinal groove 156 similar to the grooves 146 and receiving a set screw 158 threadably mounted in the element 152. Upper bit 150 is secured to the shorter legs 138 and 142 of plungers 130 and 134 respectively by a screw 160 passing through the element 152 and threaded into leg 138 of plunger 130 and a similar screw 161 (Fig. 5) passing through the element 154 and threaded into the leg 142 of plunger 134.

In similar manner, a lower bit or crossbar 162 is formed of a partially tubular, elongated, straight element 164 similar to element 152 of the upper bit 150 and a straight, elongated plunger element 166 similar to element 154 and provided with a groove 168 for cooperative reception of a locking set screw 170. Bit 162 is secured to plungers 132 and 136 by a screw 172 passing through element 166 and threaded into leg 140 of plunger 132 and a screw 174 passing through element 164 and threaded into leg 144 of plunger 136. It will be apparent that the bits 150 and 162 are adjustably extensible and lockable in any desired position in the same manner as described for the operation of the plungers 130, 132, 134 and 136 with the tubular portions 14, 20, 34 and 40 of members 10, 20, 30 and 32 respectively. It should also be pointed out that the interconnection with bits 150 and 162 effected by screws 160, 161, 172 and 174 are relatively, although not loosely, pivotal to allow for any necessary swinging of the members 10, 12, 30 and 32 about the axes of legs 138, 140, 142 and 144.

A screw 176 threaded into the outer or rightmost end of bit element 152 holds one end link of nose chain 178, and a hook element 180 similar to hook element 120 is mounted on the outer or leftmost end of the element 154 for releasably receiving and holding any link of nose chain 178 adjacent the opposite end thereof.

In similar fashion a flexible chin encircling chain 182 is provided and has one end link thereof removably secured to the outer or rightmost end of bit element 166 by a screw 184, while the outer or leftmost end of bit element 164 is provided with a hook element 186 similar to hooks 180 and 120 for releasably receiving and holding any link of the chain 182 adjacent the opposite end thereof.

It will be apparent that, by virtue of the scissor-like relationship of members 10 and 12 and members 30 and 32, complete forward and lateral access to an animal's oral cavity is provided when the speculum of this invention is installed on the animal with the bit 150 underlying his upper front teeth and the bit 162 overlying his lower front teeth. The full adjustability of the speculum of this invention in order to properly fit the animal and retain his jaws in the desired open position will also now be apparent. Likewise, the convenient but reliable adjustable nature of the neck chain 116, the nose chain 178 and the chin chain 182 will be manifest.

It will, therefore, now be clear that the invention is ideally adapted for the attainment of all of the above-mentioned and other objectives thereof. It will be evident to those skilled in the art, however, that certain minor modifications and changes could be made from the exact structural details disclosed for purposes of illustration without departing from the true spirit and intention of the invention. Accordingly, it should be understood that the invention is to be deemed limited only by the scope of the appended claims.

Having thus described the invention, what is claimed as new and desired to be secured by Letters Patent is:

1. In a small animal speculum, a first pair of elongated members each having a forwardmost and a rearmost end, said first pair of members being crossed intermediate their ends; means pivotally interconnecting said first pair of members at their zone of crossing; a second pair of elongated members each having a forwardmost and a rearmost end, said second pair of members being crossed intermediate their ends and spaced laterally from said first pair of members; means pivotally interconnecting said second pair of members at their zone of crossing; an upper, adjustably extensible bit element; structure interconnecting said upper element adjacent one extremity thereof with one of said first pair of members adjacent the forwardmost end thereof; structure interconnecting said upper element adjacent the opposite extremity thereof with the corresponding one of said second pair of members adjacent the forwardmost end thereof; a lower, adjustably extensible bit element; structure interconnecting said lower element adjacent one extremity thereof with the other of said first pair of members adjacent the forwardmost end thereof; structure interconnecting said lower element adjacent the opposite extremity thereof with the other of said second pair of members adjacent the forwardmost end thereof; and mechanism on each of said pairs of members respectively for releasably holding the rear ends of the members of each pair thereof spaced apart any of a plurality of different distances.

2. In a small animal speculum, a first pair of elongated members each having a forwardmost and a rearmost end, said first pair of members being crossed intermediate their ends; means pivotally interconnecting said first pair of members at their zone of crossing; a second pair of elongated members each having a forwardmost and a rearmost end, said second pair of members being crossed intermediate their ends and spaced laterally from said first pair of members; means pivotally interconnecting said second pair of members at their zone of crossing; an upper bit element; structure interconnecting said upper element adjacent one extremity thereof with one of said first pair of members adjacent the forwardmost end thereof; structure interconnecting said upper element adjacent the opposite extremity thereof with the corresponding one of said second pair of members adjacent the forwardmost end thereof; a lower bit element; structure interconnecting said lower element adjacent one extremity thereof with the other of said first pair of members adjacent the forwardmost end thereof; structure interconnecting said lower element adjacent the opposite extremity thereof with the other of said second pair of members adjacent the forwardmost end thereof; each of said members and its corresponding structure presenting an adjustably extensible assembly; and mechanism on each of said pairs of members respectively for releasably holding the rear ends of the members of each pair thereof spaced apart any of a plurality of different distances.

3. In a speculum as set forth in claim 2, wherein, each of said elements is adjustably extensible.

4. In a speculum as set forth in claim 2, wherein the interconnection between each structure and the corresponding element is pivotal.

5. In a small animal speculum, a first pair of elongated members each having a forwardmost and a rearmost end, said first pair of members being crossed intermediate their ends; means pivotally interconnecting said first pair of members at their zone of crossing; a second pair of elongated members each having a forwardmost and a rearmost end, said second pair of members being crossed intermediate their ends and spaced laterally from said first pair of members; means pivotally interconnecting said second pair of members at their zone of crossing; an upper bit element; structure interconnecting said upper element adjacent one extremity thereof with one of said first pair of members adjacent the forwardmost end thereof; structure interconnecting said upper element adjacent the opposite extremity thereof with the corresponding one of said second pair of members adjacent the forwardmost end thereof; a lower bit element; structure interconnecting said lower element adjacent one extremity thereof with the other of said first pair of members adjacent the forwardmost end thereof; structure interconnecting said lower element adjacent the opposite extremity with the other of said second pair of members adjacent the forwardmost end thereof; a retainer piece on each pair of members extending inwardly from said zone of crossing thereof in a direction generally toward the other pair of members; and mechanism on each of said pairs of members respectively for releasably holding the rear ends of the members of each pair thereof spaced apart any of a plurality of different distances.

6. In a speculum as set forth in claim 5, wherein each of said pieces is generally L-shaped and includes an adjustably extensible, inwardly extending leg and a rearwardly extending leg.

7. In a small animal speculum, a first pair of elongated members each having a forwardmost and a rearmost end, said first pair of members being crossed intermediate their ends; means pivotally interconnecting said first pair of members at their zone of crossing; a second pair of elongated members each having a forwardmost and a rearmost end, said second pair of members being crossed intermediate their ends and spaced laterally from said first pair of members; means pivotally interconnecting said second pair of members at their zone of crossing; an upper bit element; structure interconnecting said upper element adjacent one extremity thereof with one of said first pair of members adjacent the forwardmost end thereof; structure interconnecting said upper element adjacent the opposite extremity thereof with the corresponding one of said second pair of members adjacent the forwardmost end thereof; a lower bit element; structure interconnecting said lower element adjacent one extremity thereof with the other of said first pair of members adjacent the forwardmost end thereof; structure interconnecting said lower element adjacent the opposite extremity thereof with the other of said second pair of members adjacent the forwardmost end thereof; mechanism on each of said pairs of members respectively for releasably holding the rear ends of the members of each pair thereof spaced apart any of a plurality of different distances; and means for releasably holding the speculum on an animal comprising a flexible neck chain secured adjacent one extremity thereof to one pair of members at said zone of crossing of the latter, a hook on the other pair of elements at said zone of crossing thereof adapted to releasably hold any of a plurality of parts of said neck chain remote from said one extremity thereof, a nose chain secured adjacent one extremity thereof to one extremity of said upper bit element, a hook on the opposite extremity of said upper bit element adapted to releasably hold any of a plurality of parts of said nose chain remote from said one extremity thereof, a chin chain secured adjacent one extremity thereof to one extremity of said lower bit element, and a hook on the opposite extremity of said lower bit element adapted to releasably hold any of a plurality of parts of said chin chain remote from said one extremity thereof.

References Cited in the file of this patent

UNITED STATES PATENTS

| | | |
|---|---|---|
| 548,409 | Vetter | Oct. 22, 1895 |
| 862,020 | Rutherford | July 30, 1907 |
| 2,096,083 | Berzina | Oct. 19, 1937 |